May 9, 1961    J. LAUTENBACHER    2,983,191
HIGH-SPEED WIDE-ANGLE PHOTOGRAPHIC OBJECTIVE
Filed Feb. 15, 1956
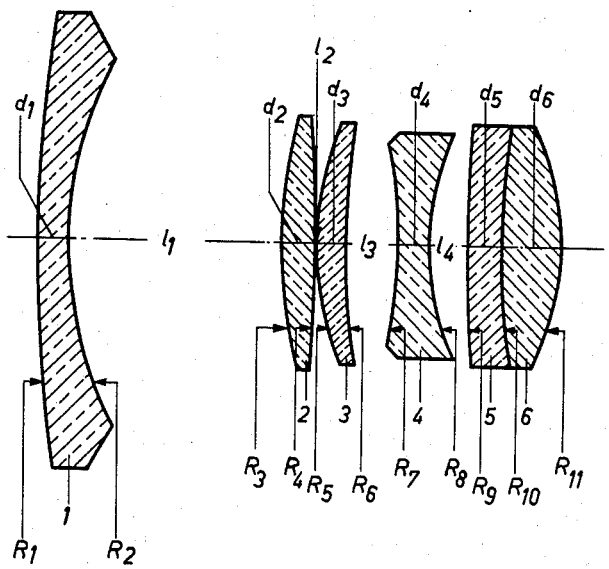
Inventor:
JOHANN LAUTENBACHER
Richards & Geier
ATTORNEYS United States Patent Office 2,983,191
Patented May 9, 1961

2,983,191
HIGH-SPEED WIDE-ANGLE PHOTOGRAPHIC OBJECTIVE

Johann Lautenbacher, Munich, Germany, assignor to Enna-Werk Optische Anstalt Dr. Appelt K.G., Munich, Germany, a corporation Filed Feb. 15, 1956, Ser. No. 565,711
Claims priority, application Germany Feb. 19, 1955
1 Claim. (Cl. 88—57)

This invention relates to a high-speed wide-angle photographic objective and relates more particularly to an objective of this type consisting of five elements and having a main part in the form of a triplet.

Wide-angle objectives are used in such cameras wherein for mechanical reasons it is necessary to have a comparatively large distance between the plane of the image and the rear vortex of the objective. Such cameras are, for example, single lens reflex cameras. A drawback of these cameras is that they are quite large in size and this large size results in a high degree of so-called vignetting. In order to avoid this it is necessary to use lenses of excessively great diameter, particularly as far as the front lens is concerned. This constitutes a substantial manufacturing drawback and limits the possibility of correcting individual optical defects, particularly as far as sagittal coma is concerned.

An object of the present invention is to eliminate the above stated drawbacks of prior art constructions.

Other objects will become apparent in the course of the following specification.

The device of the present invention is a high-speed five-membered wide-angle photographic objective having a main part consisting of a modified triplet and a negative meniscus located in front of the main part at a compartively large air gap therefrom for the primary purpose of extending the sectional widths of the main part. The concave surface of the meniscus is turned toward the main member of the device and its focal length amounts at most 2.3 times the focal length of the entire system. The modified triplet is so constructed that a negative biconcave lens is enclosed between two lens elements, each of which may consist of a pair of lenses, whereby the pair of lenses located on the side of the image consists of a diverging element and a converging element, the two elements being cemented together. The other pair of lenses consists of two converging individual parts. This objective is corrected for a minimum opening ratio of 1 to 2.8 spherically, comatically and astigmatically as well as in relation to field curvature of the image and distortion. The chromatic correction extends over a wave-length range from 434 mu to 656 mu. In accordance with a feature of the present invention the drawbacks of prior art constructions can be effectively avoided or at least diminished to a very substantial extent by making the air gap between the negative meniscus and the modified triplet at most 1.1 times the over-all length of this triplet, while simultaneously the ratio of the absolute refractive powers of the first and second refractive surfaces of the objective is at most 0.4, while the ratio of the refractive powers of the fourth and sixth refractive surfaces of the objective is at most 0.5.

The invention will appear more clearly from the following detailed description when taken in connection with the accompanying drawing showing, by way of example, a preferred embodiment of the inventive idea.

The sole figure of the drawing is a diagrammatic section through an objective constructed in accordance with the present invention.

The drawing illustrates an objective having a main part H consisting of a modified triplet. A negative meniscus M consists of the element LI, the curved surface of which is directed to the main part H. The negative meniscus M is separated from the main part H by a large air gap $l_1$. The focal length $F_m$ of the negative meniscus is numerically less than 2.3 times the focal length $f$ of the total system.

It is apparent that said air gap $l_1$ is at most 1.1 times the over-all length of the main part H. The air gap $l_1$ may range between 0.5 and 1.1 times of said length which may be represented by the formula $\Sigma(d+l)_H$. The over-all length of the objective is less than $1.4f$. As already stated, it is necessary that at the same time the ratio of the refractive powers of the first and second refractive surfaces of the objective amount at most to 0.4, as may be represented by the formula $$\left|\frac{B_1}{B_2}\right| \leq 0.4$$

At the same time the ratio of the refractive powers of the fourth and sixth refractive surfaces of the objective should be at most 0.5, as represented by the formula $$\left|\frac{B_4}{B_6}\right| \leq 0.5$$

The refractive power is defined by the formula $$\frac{n'-n}{R}$$

wherein $n$ is the mean refractive index of the medium before refraction, $n'$ is the mean refractive index of the medium after refraction at the corresponding surface, and R is the radius of curvature of the corresponding surface.

By simultaneously fulfilling the above conditions it is possible to provide for an opening ratio of 1:2.5, an excellent uniform correction of image errors over an angular field of about 65°. Thus the over-all length of the entire system can be made considerably shorter than prior art constructions and this makes it possible to provide lenses of a substantially smaller diameter, particularly for the negative meniscus M, even with uniform illumination over the entire field. Thus the costs of manufacture are considerably reduced.

According to a further embodiment of the invention, an improvement in the picture, particularly as far as astigmatic correction is concerned, may be achieved when the refractive power $B_3$ of the third refractive surface of the objective amounts to at least 3 times and preferably from 3 to 20 times the refractive power of the first refractive surface of the objective, as represented by the formula $B_3 \geq 3B_1$.

A further advantage of the objective of the present invention consists in a uniform chromatic correction which is attained primarily by the comparatively slight curvature of the cemented surface $R_{10}$ in the cemented element located toward the image. This is attained on the one hand by the use of glass having an Abbe-number of at most 34 and preferably between 25 and 34 for the bi-concave negative element of the triplet modification, according to the formula $L_{IV} \leq 34$, and on the other hand through the requirement that the sum of the axial thicknesses of the two converging elements $L_{II}$ and $L_{III}$ arranged in front of the bi-concave negative element should be at most the double of the following air gap $l_3$ and preferably range between 1 and 2 times said gap according to the formula $d_{II}+d_{III} \leq 2l_3$. Due to this arrangement the radius of the cemented surface in the cemented element directed toward the image is maintained greater than 0.8 times the focal length of the entire system. This also represents a substantial improvement in the manufacturing facilities. Furthermore, this makes it possible to form the cemented element directed toward the image eventually as a simple converging element.

The following data refer to a specific example of the construction of the present invention: The focal length therefore amounts to $f=1.0$ and the back focal length for a ray coming from infinity is $s'=1.00950$. The radii of the individual surfaces are designated as R, the axial thicknesses as $d$, the air gaps as $l$, the refractive indices as $n$, and the Abbe numbers as $v$.

The following example is given by way of exemplification only.

Example

[Relative aperture F: 2.5    Angular field 65°]

| Lens | Radii | Axial Thicknesses | Refractive Indices | Abbe Numbers |
|---|---|---|---|---|
| Lens I | $R_1=+2.9000$ | $d_I=0.040$ | $n_I=1.51821$ | $v_I=65.2$ |
|  | $R_2=+0.7890$ | $l_1=0.440$ |  |  |
| Lens II | $R_3=+0.9300$ | $d_{II}=0.070$ | $n_{II}=1.74400$ | $v_{II}=44.7$ |
|  | $R_4=-5.9000$ | $l_2=0.002$ |  |  |
| Lens III | $R_5=+0.6135$ | $d_{III}=0.058$ | $n_{III}=1.69347$ | $v_{III}=53.5$ |
|  | $R_6=+1.4000$ | $l_3=0.113$ |  |  |
| Lens IV | $R_7=-0.9400$ | $d_{IV}=0.055$ | $n_{IV}=1.68893$ | $v_{IV}=31.1$ |
|  | $R_8=+0.5230$ | $l_4=0.082$ |  |  |
| Lens V | $R_9=+3.8500$ | $d_V=0.070$ | $n_V=1.66680$ | $v_V=33.1$ |
| Lens VI | $R_{10}=+1.4000$ | $d_{VI}=0.120$ | $n_{VI}=1.69100$ | $v_{VI}=54.9$ |
|  | $R_{11}=-0.5290$ |  |  |  |

It is apparent that the present invention is not limited to the example described above, particularly to the use of lenses of the form herein described. By way of example, to provide additional correction means it is possible to split up the rear cemented element into a plurality of spaced elements. All such and other variations and modifications are to be included within the scope of the present invention.

What is claimed is:

A photographic objective consisting of four lens components comprising a main part consisting of a modified triplet and a negative meniscus located in front of said main part at a substantially large air gap therefrom and having a concave surface directed toward said main part, the focal length of the meniscus being at most 2.3 times the focal length of the entire system, said triplet consisting of a negative bi-concave lens and two lens components enclosing said bi-concave lens, one of the lens components consisting of a diverging element and a converging element and located on the side of the image, and the other lens component consisting of two separate converging elements, the photographic objective being characterized by the following formulae:

$$0.5 \times \Sigma(d+l)_{II} < l_1 < 1.1 \times \Sigma(d+l)_{II}$$

$$\left|\frac{B_1}{B_2}\right| < 0.4$$

$$\left|\frac{B_4}{B_6}\right| < 0.5$$

characterized by the following constructional data:

| Lens | Radii | Axial Thicknesses | Refractive Indices | Abbe Numbers |
|---|---|---|---|---|
| Lens I | $R_1=+2.9000$ | $d_I=0.040$ | $n_I=1.51821$ | $v_I=65.2$ |
|  | $R_2=+0.7890$ | $l_1=0.440$ |  |  |
| Lens II | $R_3=+0.9300$ | $d_{II}=0.070$ | $n_{II}=1.74400$ | $v_{II}=44.7$ |
|  | $R_4=-5.9000$ | $l_2=0.002$ |  |  |
| Lens III | $R_5=+0.6135$ | $d_{III}=0.058$ | $n_{III}=1.69347$ | $v_{III}=53.7$ |
|  | $R_6=+1.4000$ | $l_3=0.113$ |  |  |
| Lens IV | $R_7=-0.9400$ | $d_{IV}=0.055$ | $n_{IV}=1.68893$ | $v_{IV}=31.1$ |
|  | $R_8=+0.5230$ | $l_4=0.082$ |  |  |
| Lens V | $R_9=+3.8500$ | $d_V=0.070$ | $n_V=1.66680$ | $v_V=33.1$ |
| Lens VI | $R_{10}=+1.4000$ | $d_{VI}=0.120$ | $n_{VI}=1.69100$ | $v_{VI}=54.9$ |
|  | $R_{11}=-0.5290$ |  |  |  | wherein R are the radii of the refracting surfaces, $d$ are the axial thicknesses, $l$ are the separations, $n$ are the refractive indices and $v$ are the Abbe numbers.

References Cited in the file of this patent

UNITED STATES PATENTS

| | | |
|---|---|---|
| 1,934,561 | Rayton | Nov. 7, 1933 |
| 1,955,590 | Lee | Apr. 17, 1934 |
| 2,649,022 | Angenieux | Aug. 18, 1953 |
| 2,696,758 | Angenieux | Dec. 14, 1954 |
| 2,746,351 | Tronnier | May 22, 1956 |